US012675885B2

(12) United States Patent　　　(10) Patent No.:　US 12,675,885 B2

Taminato　　　(45) Date of Patent:　Jul. 7, 2026

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Tomoki Taminato, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 332 days.

(21) Appl. No.: 18/180,166

(22) Filed: Mar. 8, 2023

(65) Prior Publication Data

US 2023/0222672 A1　　Jul. 13, 2023

Related U.S. Application Data

(63) Continuation of application No. PCT/JP2021/038880, filed on Oct. 21, 2021.

(30) Foreign Application Priority Data

Nov. 9, 2020　　(JP) ................................. 2020-186749

(51) Int. Cl.
G06T 7/20　　　(2017.01)
G06T 3/40　　　(2024.01)
(Continued)

(52) U.S. Cl.
CPC .................. G06T 7/20 (2013.01); G06T 3/40 (2013.01); G06T 5/20 (2013.01); G06T 7/70 (2017.01);
(Continued)

(58) Field of Classification Search
CPC .... G06T 7/20; G06T 3/40; G06T 5/20; G06T 7/70; G06T 2207/20132; G06T 7/248;
(Continued)

(56) References Cited

U.S. PATENT DOCUMENTS 9,965,860 B2* 5/2018 Nguyen et al. ....... G06T 7/0044
2019/0114804 A1* 4/2019 Sundaresan et al. ..... G06T 7/74
(Continued)

FOREIGN PATENT DOCUMENTS

JP　　2009-212637 A　　9/2009
JP　　2009-245100 A　　10/2009
(Continued)

OTHER PUBLICATIONS

International Search Report issued by the Japan Patent Office on Jan. 18, 2022 in corresponding International Application No. PCT/JP2021/038880, with English translation.

*Primary Examiner* — Matthew C Bella
*Assistant Examiner* — Daniel J. Santos
(74) *Attorney, Agent, or Firm* — Carter, DeLuca & Farrell LLP

(57) ABSTRACT

An image processing apparatus comprises a detection unit configured to detect a specific portion of a subject before detecting the subject in a search region of a first frame image, and a processing unit configured to perform tracking processing to track the subject in the first frame image after the detection unit has detected the specific portion.

10 Claims, 14 Drawing Sheets

(51) Int. Cl.
| | | |
|---|---|---|
| *G06T 5/20* | (2006.01) | |
| *G06T 7/70* | (2017.01) | |
| *G06V 10/25* | (2022.01) | |

(52) U.S. Cl.
CPC .... *G06V 10/25* (2022.01); *G06T 2207/20132* (2013.01); *G06V 2201/07* (2022.01)

(58) Field of Classification Search
CPC ....... G06T 7/246; G06T 7/215; G06T 7/0002; G06T 7/11; G06T 7/74; G06V 10/25; G06V 2201/07; G06V 10/82; G06V 20/54; G06V 40/161; G06V 20/52; G06V 40/10; G06K 9/00362
USPC ......................................................... 382/139
See application file for complete search history.

(56)                         References Cited

U.S. PATENT DOCUMENTS

| | | | |
|---|---|---|---|
| 2023/0230277 A1* | 7/2023 | Ikeda ......................... | G06T 7/73 |
| 2023/0298329 A1 | 9/2023 | Taminato | |

FOREIGN PATENT DOCUMENTS

| | | | |
|---|---|---|---|
| JP | 2012-138013 A | 7/2012 | |
| JP | 2017-212581 A | 11/2017 | |
| JP | 2020-043544 A | 3/2020 | |

* cited by examiner

F I G. 1
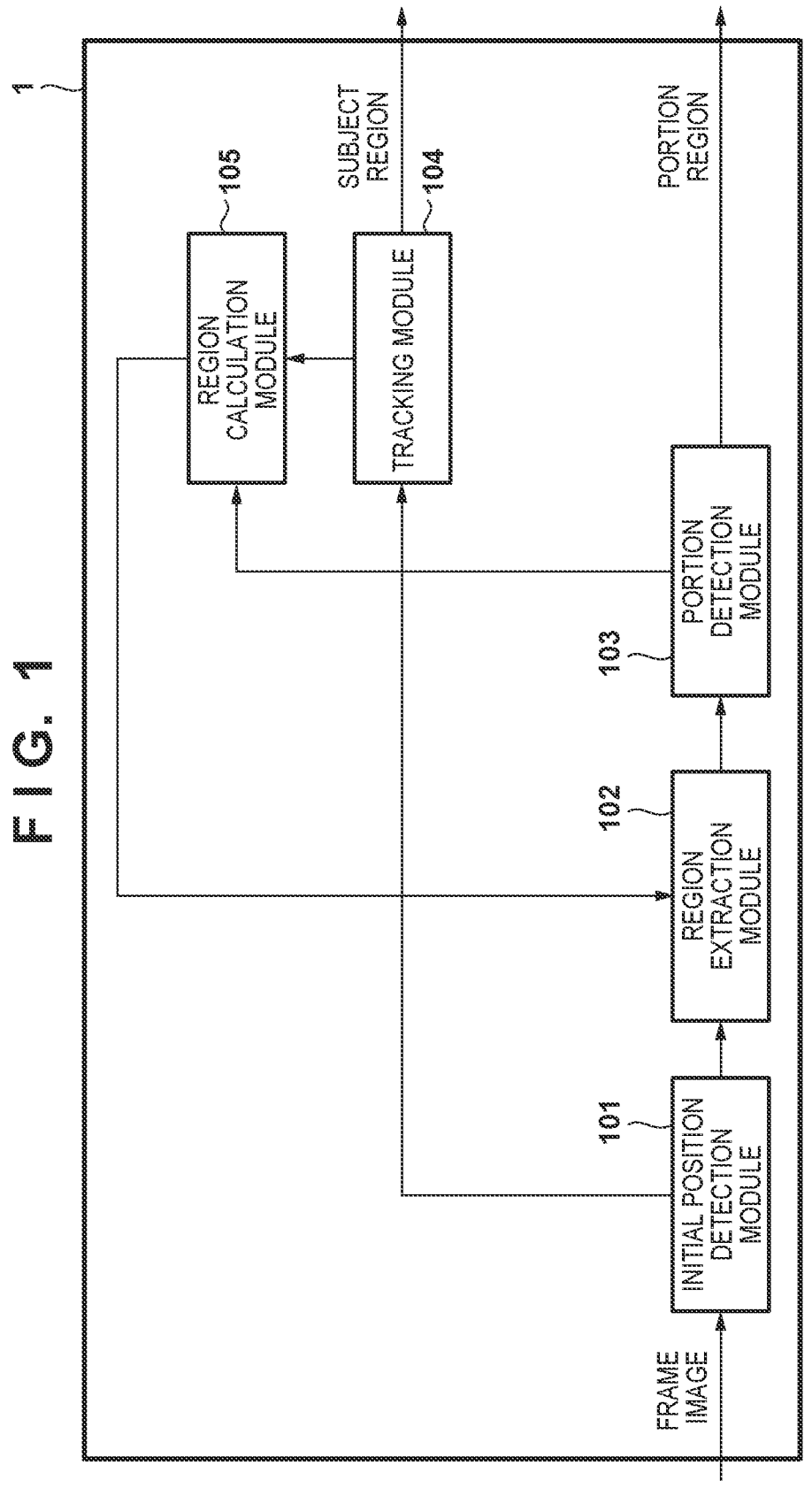

Figure 3:
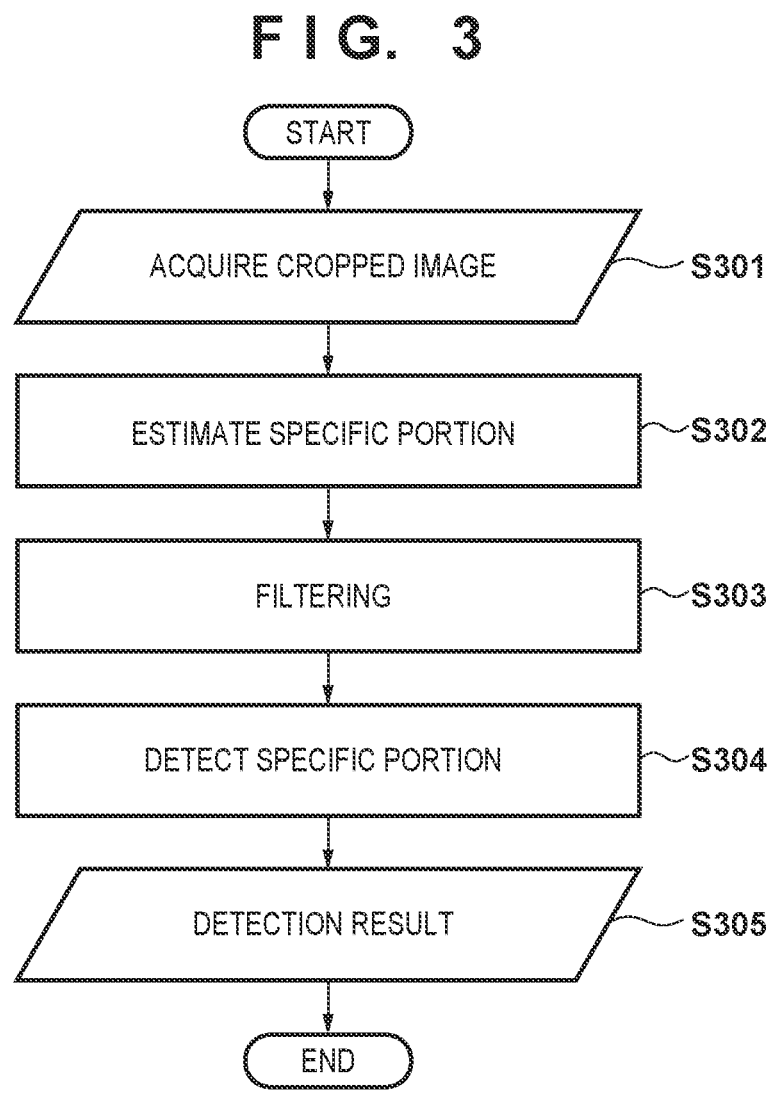

START

ACQUIRE CROPPED IMAGE —— S301

ESTIMATE SPECIFIC PORTION —— S302

FILTERING —— S303

DETECT SPECIFIC PORTION —— S304

DETECTION RESULT —— S305

END

F I G. 4A
401
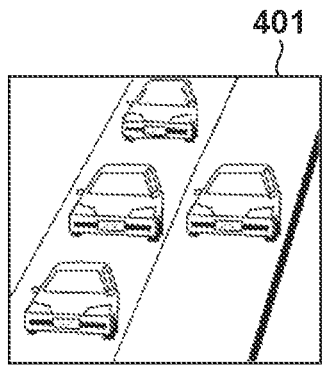
F I G. 4B
402
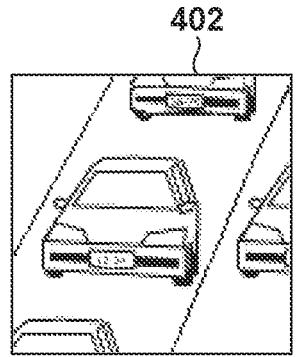
F I G. 4C
403
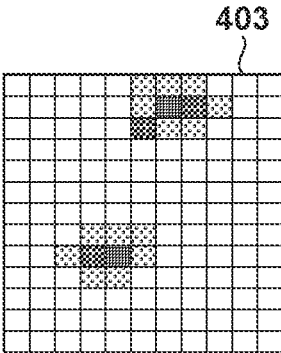

F I G. 4D
404
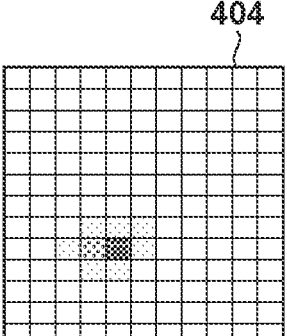
F I G. 4E
405          401
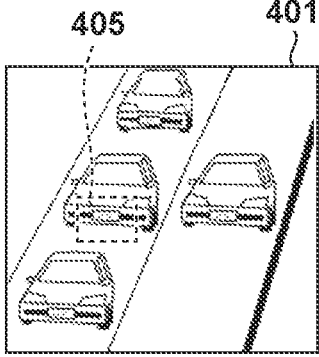

Figure 7:
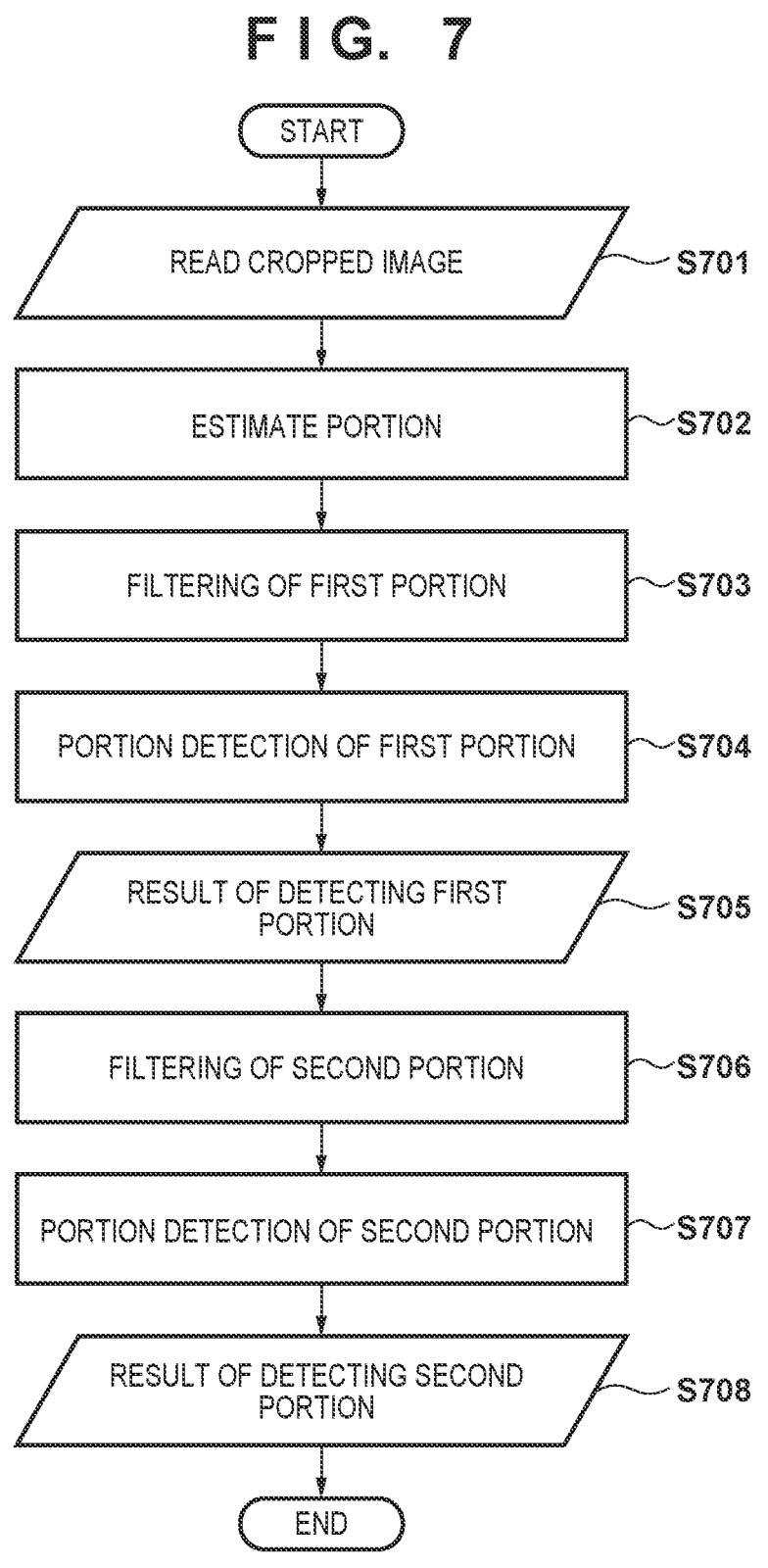

START

READ CROPPED IMAGE — S701

ESTIMATE PORTION — S702

FILTERING OF FIRST PORTION — S703

PORTION DETECTION OF FIRST PORTION — S704

RESULT OF DETECTING FIRST PORTION — S705

FILTERING OF SECOND PORTION — S706

PORTION DETECTION OF SECOND PORTION — S707

RESULT OF DETECTING SECOND PORTION — S708

END

F I G. 8A
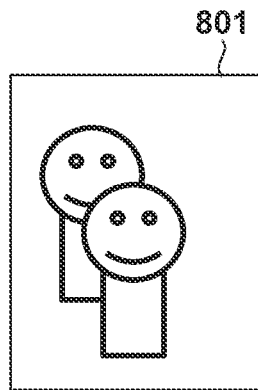
801
F I G. 8B
802
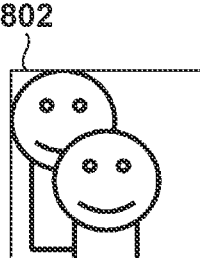
F I G. 8C
803
804
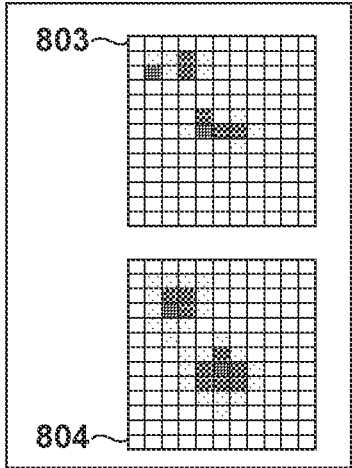
F I G. 8D
805
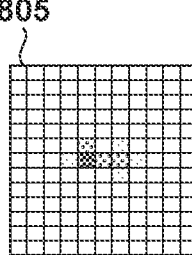

F I G. 8E
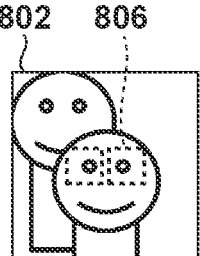
F I G. 8F
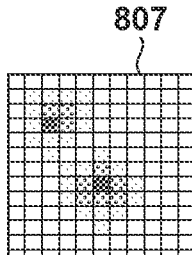
F I G. 8G
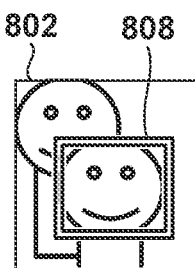

F I G. 11

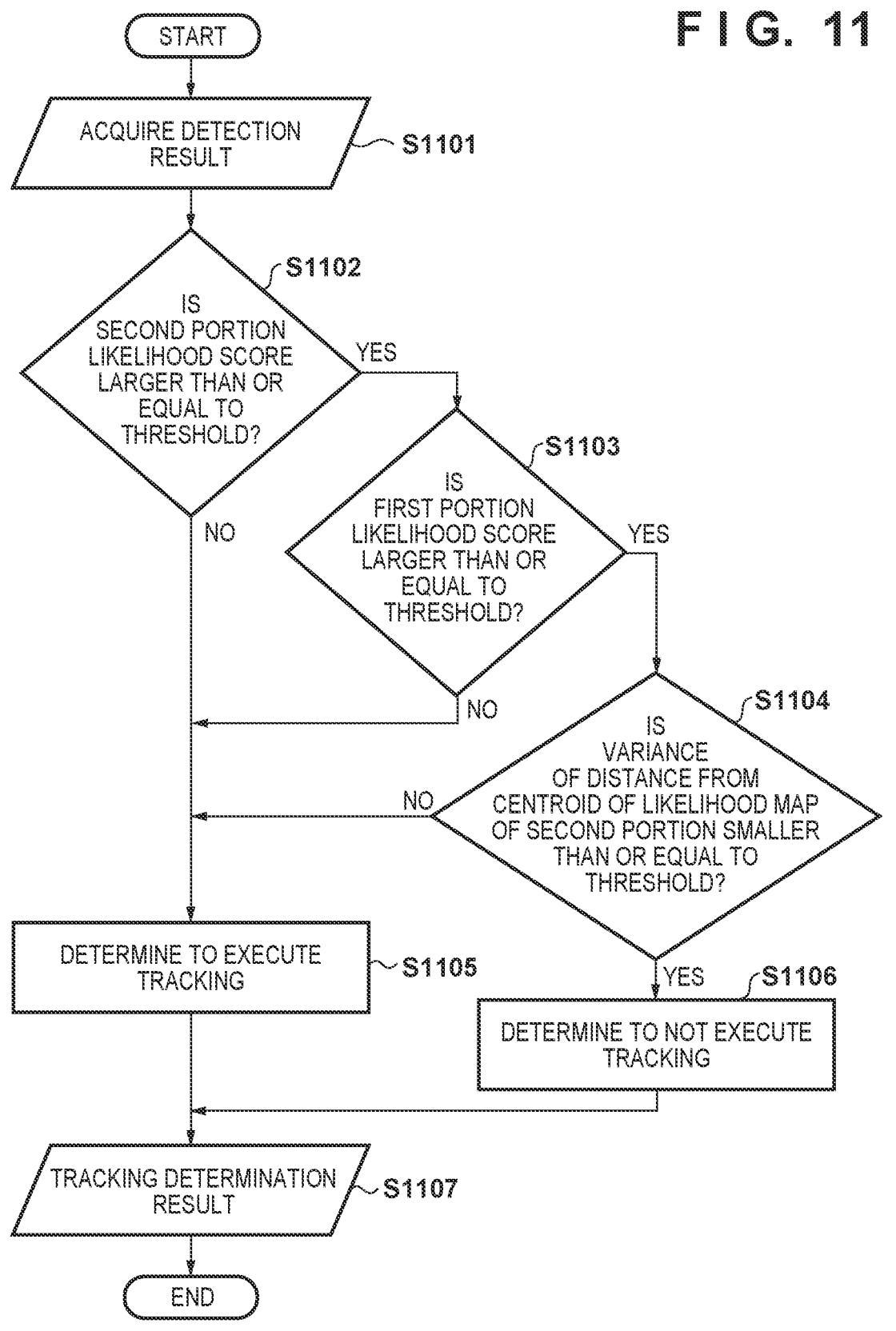

START

ACQUIRE DETECTION RESULT — S1101

S1102
IS SECOND PORTION LIKELIHOOD SCORE LARGER THAN OR EQUAL TO THRESHOLD?

YES

NO

S1103
IS FIRST PORTION LIKELIHOOD SCORE LARGER THAN OR EQUAL TO THRESHOLD?

YES

NO

S1104
IS VARIANCE OF DISTANCE FROM CENTROID OF LIKELIHOOD MAP OF SECOND PORTION SMALLER THAN OR EQUAL TO THRESHOLD?

NO

YES  S1106

DETERMINE TO EXECUTE TRACKING — S1105

DETERMINE TO NOT EXECUTE TRACKING

TRACKING DETERMINATION RESULT — S1107

END

F I G. 12
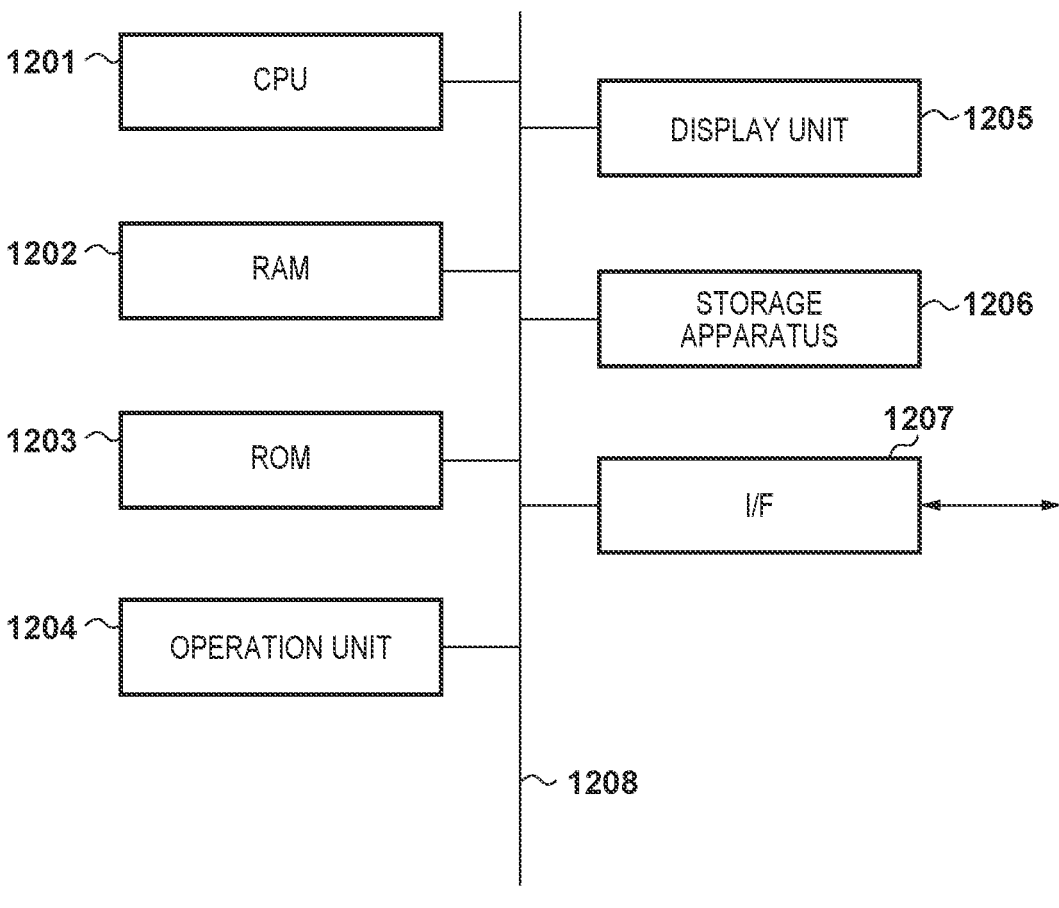

IMAGE PROCESSING APPARATUS, IMAGE PROCESSING METHOD, AND NON-TRANSITORY COMPUTER-READABLE STORAGE MEDIUM

CROSS-REFERENCE TO RELATED APPLICATIONS

This application is a Continuation of International Patent Application No. PCT/JP2021/038880, filed Oct. 21, 2021, which claims the benefit of Japanese Patent Application No. 2020-186749, filed Nov. 9, 2020, both of which are hereby incorporated by reference herein in their entirety.

BACKGROUND OF THE INVENTION

Field of the Invention

The present invention relates to a technology for tracking a subject.

Background Art

Technologies for detecting a specific subject in a frame image in a moving image are conventionally known. For example, monitoring cameras with a function of detecting a specific person or object and electronic cameras with an autofocus (AF) function of automatically focusing on a subject have been realized.

Technologies for detecting a specific portion of a subject are also known. It can be considered to use such technology for various applications, such as preventing crime by determining an automobile exhibiting specific behavior as a subject and then detecting and zooming in on a number plate, a windshield, or the like, and performing a pinpoint focus on the eyes of a person or an animal as a subject.

Patent Literature 1 proposes a technology for accurately detecting a specific part of a subject that appears small, such as the eyes, by detecting a face region of the subject and thereafter enlarging the face region if the subject is a person and the specific portion is a facial organ.

When a specific portion of a subject is to be accurately detected in a moving image as in Patent Literature 1, the subject is first detected, and the specific portion is then detected. Accordingly, detection processing is performed more than once from when a frame image is acquired until when the specific portion is detected. This increases a temporal delay (latency) that occurs from when a frame image is acquired until when the specific portion is detected. In such a situation, for example, the AF function of an electronic camera may have a problem in that AF does not appropriately work due to an increasing discrepancy between the result of detecting a specific portion of a moving subject and the actual position thereof at the time of detection.

The present invention provides a technology for reducing the time required from when a frame image is acquired until when a specific portion of a subject is detected compared to the time required in the case of conventional technologies.

CITATION LIST

Patent Literature

PTL1: Japanese Patent Laid-Open No. 2009-245100

SUMMARY OF THE INVENTION

According to the first aspect of the present invention, there is provided an image processing apparatus comprising:

a detection unit configured to detect a specific portion of a subject before detecting the subject in a search region of a first frame image; and a processing unit configured to perform tracking processing to track the subject in the first frame image after the detection unit has detected the specific portion.

According to the second aspect of the present invention, there is provided an image processing method to be performed by an image processing apparatus, the method comprising: detecting a specific portion of a subject before detecting the subject in a search region in a first frame image; and performing tracking processing to track the subject in the first frame image after the specific portion has been detected in the detection.

According to the third aspect of the present invention, there is provided a non-transitory computer-readable storage medium for storing a computer program for causing a computer to function as: a detection unit configured to detect a specific portion of a subject before detecting the subject in a search region of a first frame image; and a processing unit configured to perform tracking processing to track the subject in the first frame image after the detection unit has detected the specific portion.

Further features of the present invention will become apparent from the following description of exemplary embodiments with reference to the attached drawings.

BRIEF DESCRIPTION OF THE DRAWINGS

FIG. 1 is a block diagram showing an example functional configuration of an image processing apparatus 1.

FIG. 2 is a time chart showing an example of an execution sequence for a portion detection moduleportion detection module 103 and a tracking module 104.

FIG. 3 is a flowchart showing operation of the portion detection moduleportion detection module 103.

FIG. 4A illustrates detection of a specific portion in a frame image.

FIG. 4B illustrates detection of the specific portion in the frame image.

FIG. 4C illustrates detection of the specific portion in the frame image.

FIG. 4D illustrates detection of the specific portion in the frame image.

FIG. 4E illustrates detection of the specific portion in the frame image.

FIG. 5 illustrates filtering processing.

FIG. 7 is a flowchart showing operation of the portion detection moduleportion detection module 103.

FIG. 8A illustrates detection of a subject and a specific portion in a frame image.

FIG. 8B illustrates detection of the subject and the specific portion in the frame image.

FIG. 8C illustrates detection of the subject and the specific portion in the frame image.

FIG. 8D illustrates detection of the subject and the specific portion in the frame image.

FIG. 8E illustrates detection of the subject and the specific portion in the frame image.

FIG. 8F illustrates detection of the subject and the specific portion in the frame image.

FIG. 8G illustrates detection of the subject and the specific portion in the frame image.

FIG. 11 is a flowchart showing operation of a determination module 1001.

FIG. 12 is a block diagram showing an example hardware configuration of a computer device.

DESCRIPTION OF THE EMBODIMENTS

Figure 6:
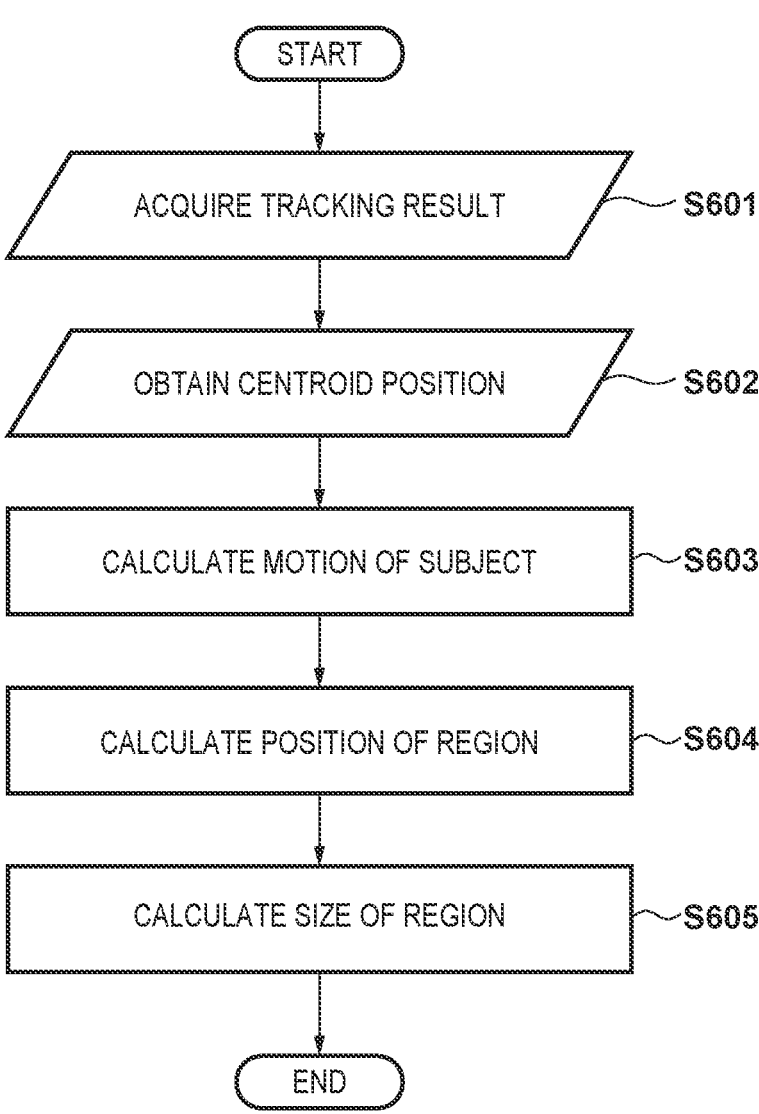
FIG. 6 is a flowchart showing operation of a region calculation module 105.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

This embodiment will describe a monitoring camera system in which an automobile exhibiting specific behavior (e.g. speeding) that is captured by a monitoring camera installed outdoors serves as a subject and is tracked, and a number plate of the automobile, which is the subject being tracked, serves as a specific portion and is detected.

In the following, t denotes an acquisition time of a frame image captured by the monitoring camera (a time when the frame image is acquired), and the acquisition time t of a (first) frame image that is acquired first from the monitoring camera is represented as 1. When the acquisition time t of a frame image of interest acquired from the monitoring camera is represented as T, the acquisition time t of a frame image acquired immediately before (preceding) the frame image of interest is represented as (T−1), and the acquisition time t of a frame image acquired immediately after (following) the frame image of interest is represented as (T−1).

First, a description will be given of an example functional configuration of an image processing apparatus 1 that tracks a subject in frame images captured by the monitoring camera in the monitoring camera system according to this embodiment, with reference to the block diagram in FIG. 1.

An initial position detection module 101 detects the subject and the specific portion of the subject in frame images corresponding to the acquisition time t=1, 2, and thus detects the position of the subject and the position of the specific portion in these frame images. If the subject disappears from the field of view of the monitoring camera and then enters the field of view again, the subject appears again in a frame image. The initial position detection module 101 detects the subject and the specific portion of the subject in the frame image in which the subject appears again (which is referred to as a frame image at the acquisition time t=1) and the following frame image (which is referred to as a frame image at the acquisition time t=2) adjacent to the frame image at the acquisition time t=1, and thus detects the position of the subject and the position of the specific portion of the subject in these frame images.

Note that a possible method for detecting the subject and the specific portion of the subject in the frame images may be, for example, a method of detecting, as a subject, an automobile passing through a set region in the frame images and detecting the specific portion of the subject using a known object detection technology with high accuracy.

A region extraction module 102 extracts as a cropped image an image in a search region, which is calculated for a present frame image by a region calculation module 105.

An portion detection module 103 detects the specific portion of the subject from the cropped image extracted by the region extraction module 102. Note that the portion detection module 103 executes detection processing, i.e. processing to detect the specific portion in the cropped image in the present frame image without waiting for the results of processing for the present frame image performed by a tracking module 104. The processing performed to detect the specific portion in the cropped image by the portion detection module 103 will be described with reference to the flowchart in FIG. 3.

In step S301, the portion detection module 103 acquires the cropped image extracted by the region extraction module 102. FIG. 4A shows a present frame image 401, and FIG. 4B shows a cropped image 402 extracted from the present frame image 401 by the region extraction module 102.

In step S302, the portion detection module 103 estimates a region of the specific portion in the cropped image. Examples of the technology for estimating the region of the specific portion in the cropped image include, for example, technologies using machine learning, deep learning, template matching, and feature point matching.

In a method using deep learning, a trained model is generated in advance by training a multilayer neural network using training data constituted by a set of pairs of images that include the specific portion and annotated data that represents the region of the specific portion in the images. The region (e.g. position and size (vertical and horizontal sizes)) of the specific portion in an unknown image can be estimated by using this type of trained model. Further, the neural network model is made lightweight in order to perform the estimation with relatively high accuracy while reducing the computational load.

In this embodiment, the position and the size (vertical and horizontal sizes) of the specific portion in the cropped image are estimated using the trained model that is thus generated in advance. FIG. 4C shows a likelihood map 403, which is obtained from the above training model by inputting the aforementioned cropped image 402 to the trained model. In a block at a position $(x, y)$ in the likelihood map 403, the likelihood that the specific portion is present in a region at the position $(x, y)$ (a region corresponding to the block) in the cropped image 402 is stored. In FIG. 4C, the likelihood is expressed by gray scale. In the following, $S(x, y)$ denotes the likelihood at the position $(x, y)$ in the likelihood map 403. Likelihood maps can be dealt with as images by associating the likelihood $S(x, y)$ with a pixel value through appropriate conversion. It is assumed below that, in step S302, the portion detection module 103 generates likelihood maps based on the cropped image.

Figure 5:
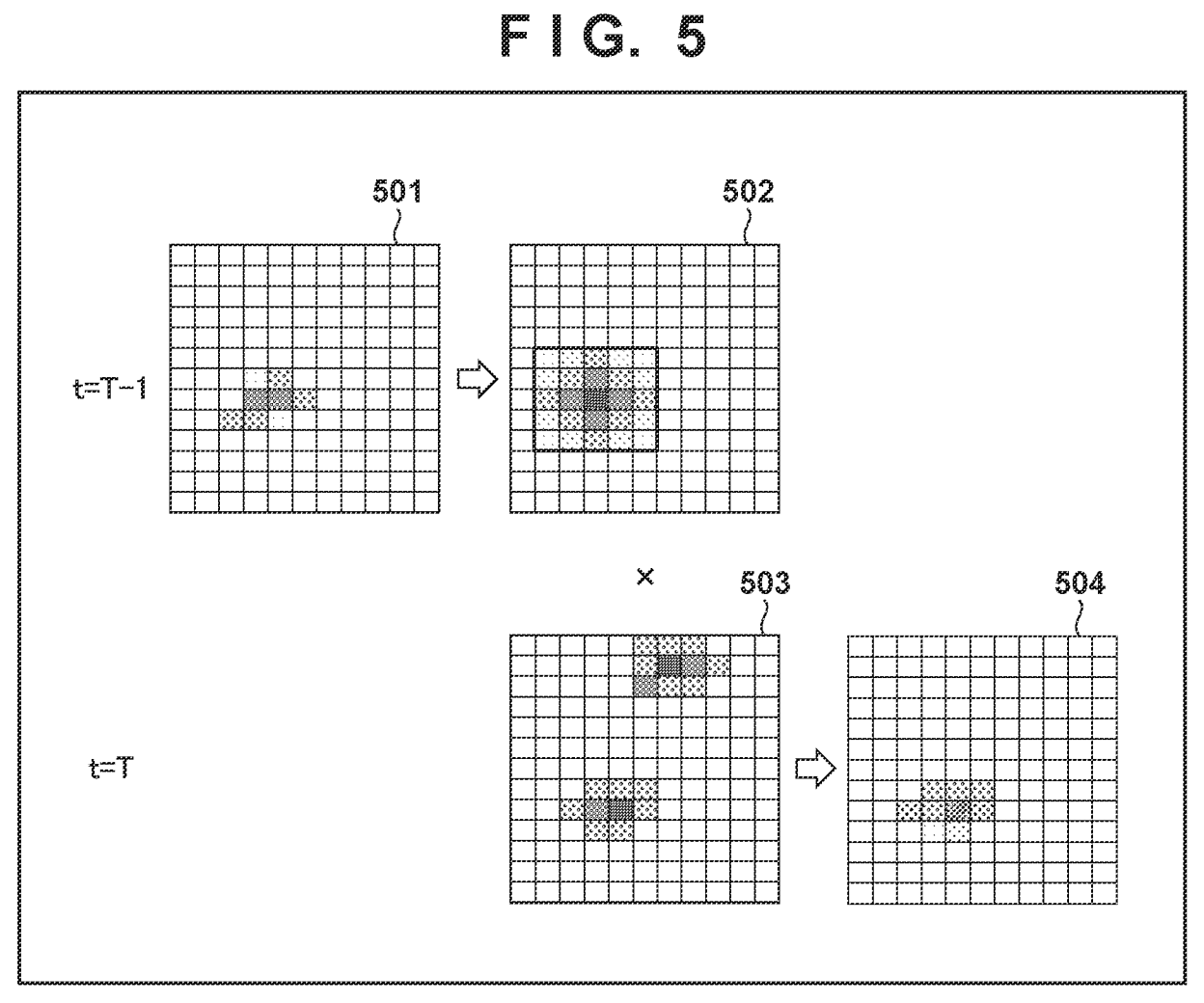

Next, in step S303, the portion detection module 103 performs filtering processing on the likelihood map. FIG. 4D shows an example of a filtered likelihood map 404 that is obtained by performing the filtering processing on the likelihood map 403. The filtering processing will be described with reference to FIG. 5.

First, the centroid position and the variance of the likelihood is calculated from a likelihood map 501 corresponding to a frame image at the acquisition time t=(T−1). Then, a Gaussian filter 502 is generated for filtering regions outside a region with a size corresponding to the variance with the centroid position as a center. Thereafter, a filtered likelihood map 504 in which regions other than the specific portion have been filtered is generated by obtaining a product of a likelihood map 503 corresponding to a frame image at the acquisition time t=T and the Gaussian filter 502.

In step S304, the portion detection module 103 applies, for example, an NMS (Non-maximum Suppression) algorithm to the filtered likelihood map (404, 504) obtained in step S303 to appropriately select a region with high likelihood, and sets a region in the cropped image that corresponds to the selected region as a region of the specific portion in the cropped image. FIG. 4E shows a region 405 in the present frame image 401 that corresponds to the region of the specific portion in the cropped image (i.e. the region of the specific portion in the present frame image 401).

In step S305, the portion detection module 103 outputs the region in the present frame image that corresponds to the region of the specific portion in the cropped image identified in step S304 as a detected region of the specific portion (detection result).

Returning to FIG. 1, the tracking module 104 performs tracking processing, i.e. processing to track the automobile, which is the subject, in the present frame image. When the portion detection module 103 operates, the tracking processing for the present frame image is performed in parallel to processing performed on the present frame image by the portion detection module 103, or is performed after the processing performed on the present frame image by the portion detection module 103.

Here, the tracking processing performed to track the automobile, which is the subject, in the present frame image can be performed by means of any of various methods, such as a method using background subtraction or optical flow, a method using a Bayesian filter such as Kalman filter or particle filter, a method using machine learning or deep learning, or a method using template matching or feature point matching. In this embodiment, the automobile is tracked using any known method, and a description of the details is omitted.

The tracking module 104 then outputs the position and the size (vertical and horizontal sizes) of a rectangular region that surrounds the subject in the present frame image as the result of the tracking processing for the present frame. Note that the tracking module 104 may output any type of information as the result of the tracking processing as long as the rectangular region that surrounds the subject in the present frame image can be identified with the information.

Note that the result of the tracking processing performed by the tracking module 104 is used to determine the search region in a frame image at the next acquisition time. It is, therefore, desirable that that the processing load of the tracking processing is small to a degree that the processing is finished before the frame image at the next acquisition time is acquired. If the tracking processing cannot be finished before the frame image at the next acquisition time is acquired, the processing may be periodically executed by, for example, skipping the processing every other frames. With this, the tracking processing does not affect the processing time from when a frame image is acquired at the next acquisition time until when the detection processing is performed.

Figure 2:
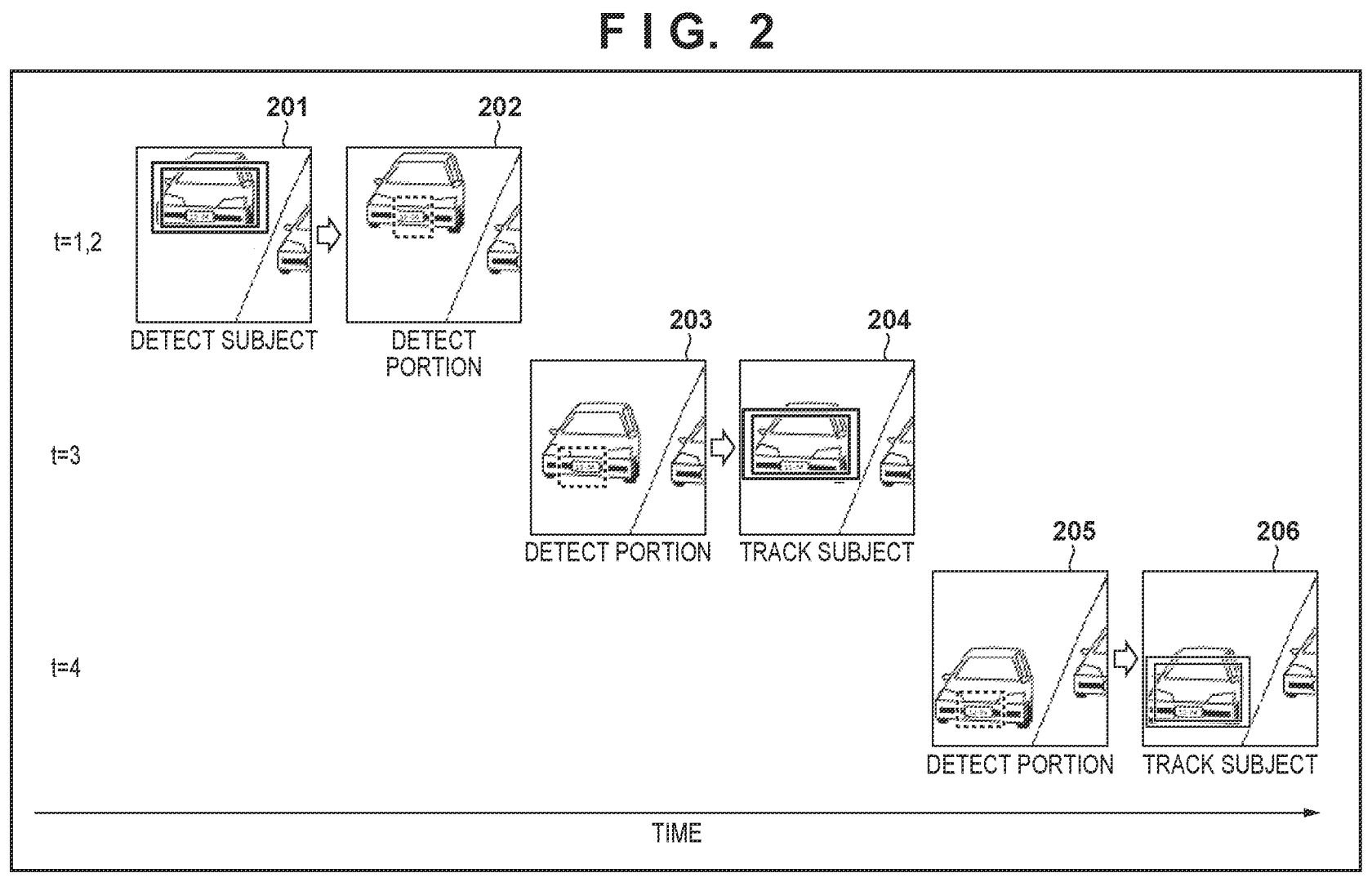

Here, an example of the execution sequence of the portion detection module 103 and the tracking module 104 will be described with reference to the time chart in FIG. 2. Note that FIG. 2 shows parts relevant to the following description.

At the acquisition time t=1 and the acquisition time t=2, a subject and a specific portion of the subject need to be correctly determined. Therefore, the initial position detection module 101 first detects the subject and then detects the specific portion of the subject.

With a frame image at the acquisition time t=3 and subsequent frame images, processing to track the subject is performed after the specific portion of the subject is detected. This enables the monitoring camera to perform AF processing and/or zoom processing using the results of detecting the specific portion before the tracking processing, and suppresses latency during such processing.

Accordingly, upon detecting the specific portion of the subject, the portion detection module 103 may transmit the detected specific portion or a feature value of the specific portion to the monitoring camera and cause the monitoring camera to perform AF processing and/or zoom processing on the specific portion. This enables the tracking module 104 to perform processing to track the specific portion in the frame images subjected to the AF processing and/or the zoom processing on the specific portion.

The region calculation module 105 calculates a search region in a frame image at the next acquisition time after the acquisition time of the present frame image, based on the search region in the present frame image or the region of the subject detected by the initial position detection module 101, and the result of the tracking processing performed by the tracking module 104. The calculation of the search region performed by the region calculation module 105 will be described with reference to the flowchart in FIG. 6.

In step S601, the region calculation module 105 acquires the results of the tracking processing performed by the tracking module 104 (the result of tracking processing performed on the present frame image and the result of tracking processing at the acquisition time immediately previous to the present frame image).

In step S602, if the present frame image is a frame image at the acquisition time t=2, the region calculation module 105 obtains the centroid position (Xc, Yc) of the region of the subject detected in the present frame image by the initial position detection module 101. Meanwhile, if the present frame image is a frame image at the acquisition time t=3 or a subsequent acquisition time, the region calculation module 105 obtains the centroid position (Xc, Yc) of the search region calculated for the present frame image by the region calculation module 105.

In step S603, the region calculation module 105 obtains a motion V($\Delta$x, $\Delta$y) of the subject between frame images. For example, the region calculation module 105 may obtain, as V($\Delta$x, $\Delta$y), a motion vector V1 from the result of tracking processing performed at the acquisition time immediately previous to the present frame image (the position of the rectangular region that surrounds the subject in the frame image at the acquisition time immediately previous to the present frame image) to the result of tracking processing in the present frame image (the position of the rectangular region that surrounds the subject in the present frame image). Alternatively, for example, the region calculation module 105 may obtain, as V($\Delta$x, $\Delta$y), a motion vector V2($\Delta$x, $\Delta$y) from the centroid position of the specific portion in the frame image at the acquisition time immediately previous to the present frame image to the centroid position of the specific portion in the present frame image. Alternatively, for example, the region calculation module 105 may obtain, as V($\Delta$x, $\Delta$y), a mean vector of the motion vector V1 and the motion vector V2.

In step S604, the region calculation module 105 obtains the centroid position of the search region in the frame image at the next acquisition time after the acquisition time of the present frame image as (Xc+$\Delta$x, Yc+$\Delta$y).

In step S605, the region calculation module 105 determines the size (vertical and horizontal sizes) of the search region in the frame image at the next acquisition time after the acquisition time of the present frame image. For example, the region calculation module 105 obtains, in advance, the length L of one side of the search region that maximizes the detection ratio to one side of the region that surrounds the specific portion, and determines the size of the search region in the frame image at the next acquisition time after the acquisition time of the present frame image to be the length L. Note that the method for determining the size (vertical and horizontal sizes) of the search region in the frame image at the next acquisition time after the acquisition time of the present frame image is not limited to a specific determination method. For example, giving consideration to the motion of the specific portion of the subject, the size of the search region may be increased as the motion is larger. In this case, the subject and/or the specific portion can be prevented from being lost in the frame image.

As described above, in this embodiment, a specific portion of a subject is detected in a frame image by performing detection processing once, and this subject is tracked after the detection. This can suppress latency from when a frame image is acquired until when another processing is performed using the result of detecting the specific portion, compared to the case of executing detection processing or tracking processing more than once before a specific portion of a subject is detected as in the conventional technology. As a result, for example, AF and zoom-in can be rapidly performed on the number plate, which is the specific portion, before the automobile passes through the field of view of the monitoring camera, and the details of the specific portion can be captured more accurately.

Second Embodiment

The following embodiments, including this embodiment, will describe differences from the first embodiment, and are the same as the first embodiment unless otherwise stated. This embodiment will describe a camera system in which a specific person captured by an electronic camera is a subject, at least one of the eyes of this person is detected as a specific portion (first portion), and the face that includes the eye(s) of the person is detected as a second portion.

The image processing apparatus 1 that has the configuration shown in FIG. 1 can also be applied to this type of camera system, whereas this embodiment is different from the first embodiment in the operation of the portion detection module 103 and the region calculation module 105.

The operation of the portion detection module 103 according to this embodiment will be described with reference to the flowchart in FIG. 7.

In step S701, the portion detection module 103 acquires a cropped image extracted by the region extraction module 102. FIG. 8A shows a present frame image 801, and FIG. 8B shows a cropped image 802 extracted from the present frame image 801 by the region extraction module 102.

In step S702, the portion detection module 103 estimates the region of the first portion and the second portion in the cropped image. Similar to the first embodiment, this embodiment also uses a trained model that has been trained by means of deep learning.

In the method using deep learning, a set of pairs of images that include the first portion and the second portion and annotated data that represents regions where the respective portions are present is prepared as training data. The regions (e.g. position and size thereof) where the first portion and the second portion are present can be estimated in an unknown image by generating a trained model that is a neural network that is constituted by multiple layers including a convolutional layer and is trained in advance using the training data.

Further, here, the first portion and the second portion are learned with one neural network model by means of multitask learning. This learning method enables estimation of a plurality of portions at the same processing speed as when one portion is estimated.

In step S702 in this embodiment, the portion detection module 103 outputs likelihood maps that correspond respectively to the first portion and the second portion, using the trained model that is generated in advance as described above. A likelihood map 803 in FIG. 8C is the likelihood map for the first portion that is obtained from the aforementioned trained model by inputting the cropped image 802 to this trained model. A likelihood map 804 is the likelihood map for the second portion that is obtained from the trained model by inputting the cropped image 802 to the trained model.

The likelihood that the first portion is present in a region at a position (x, y) in the cropped image 802 is stored in a block at the position (x, y) in the likelihood map 803.

The likelihood that the second portion is present in a region at a position (x, y) in the cropped image 802 is stored in a block at the position (x, y) in the likelihood map 804. In FIG. 8C, the likelihood is expressed by gray scale.

In step S703, the portion detection module 103 performs the same filtering processing as that of the first embodiment on the likelihood map corresponding to the first portion. FIG. 8D shows a filtered likelihood map 805 that is obtained by performing the filtering processing on the likelihood map 803. That is, the centroid position and the variance of the likelihood are calculated from the likelihood map for the second portion that corresponds to a frame image at the acquisition time t=(T−1), and a Gaussian filter is generated to filter regions outside a region with a size corresponding to the variance with the centroid position as a center. Then, a filtered likelihood map in which regions other than the first portion have been filtered is generated by obtaining a product of the likelihood map for the first portion that corresponds to a frame image at the acquisition time t=T and the Gaussian filter.

Here, the center of the face and the eyes are at substantially the same positions, and it is, therefore, effective to generate the Gaussian filter from the likelihood map corresponding to the second portion. FIG. 8D shows a likelihood map 805 that has been thus subjected to the filtering processing.

In step S704, the portion detection module 103 applies, for example, an NMS (Non-maximum Suppression) algorithm to the filtered likelihood map obtained in step S703, selects up to two regions having the largest likelihood, and determines a region in the cropped image that corresponds to each of the selected region to be the region of the first portion in the cropped image. FIG. 8E shows regions 806 of the first portion in the cropped image 802.

In step S705, the portion detection module 103 outputs the regions of the first portion in the cropped image identified in step S704 as the detected regions of the first portion (the result of detecting the first portion). Accordingly, the specific portion of the subject can also be detected in this embodiment with the same amount of processing as that of the first embodiment.

In step S706, the portion detection module 103 performs the same filtering processing as that of the first embodiment on the likelihood map corresponding to the second portion.

FIG. 8F shows a filtered likelihood map 807 that is obtained by performing the filtering processing on the likelihood map 804. The Gaussian filter used here is the same as the Gaussian filter used in step S703. Then, a filtered likelihood map in which regions other than the second portion have been filtered is generated by obtaining a product of the second likelihood map corresponding to the frame image at the acquisition time t=T and the Gaussian filter.

In step S707, the portion detection module 103 applies, for example, an NMS (Non-maximum Suppression) algorithm to the filtered likelihood map obtained in step S706, selects a region having the largest likelihood, and determines a region in the cropped image that corresponds to the selected region to be the region of the second portion in the cropped image. FIG. 8G shows a region 808 of the second portion in the cropped image 802.

In step S708, the portion detection module 103 outputs the region of the second portion in the cropped image identified in step S707 as the detected regions of the second portion (the result of detecting the second portion).

Note that the series of processing in steps S703 to S705 and the series of processing in steps S706 to S708 may be performed in parallel. This enables the face to be detected while suppressing latency, as with the detection of the eyes. Further, if the result of detecting the face is present prior to the result of detecting the eyes, incorrect detection can be avoided by removing the result of detecting the eyes that is present outside a region surrounding the face.

Figure 9:
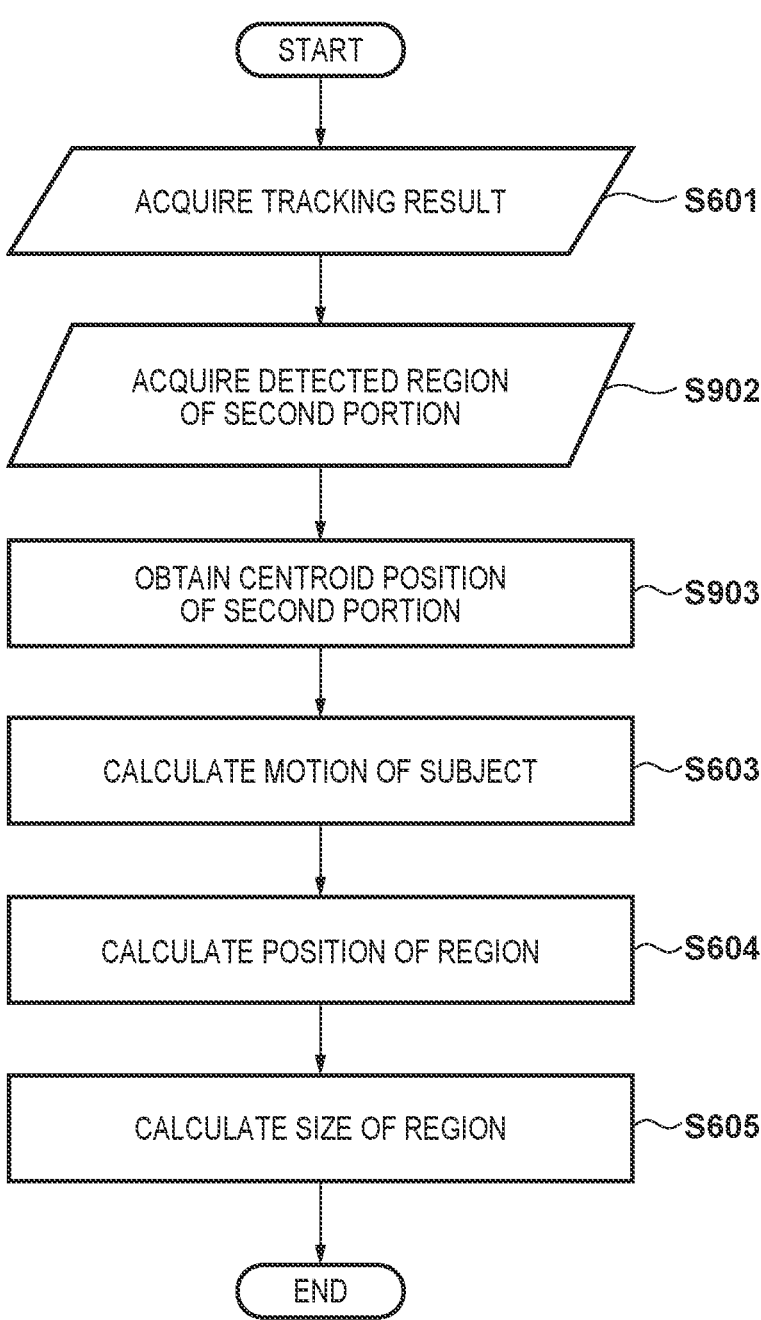
FIG. 9 is a flowchart showing operation of the region calculation module 105.

Next, the operation of the region calculation module 105 will be described with reference to the flowchart in FIG. 9. In FIG. 9, the same processing steps as those shown in FIG. 6 are assigned the same step numbers, and a description of these processing steps is omitted.

In step S902, the region calculation module 105 acquires the detected region of the second portion that has been output in step S708. In step S903, the region calculation module 105 obtains the centroid position (Xc, Yc) of the detected region of the second portion. The subsequent steps are the same as the flowchart in FIG. 6.

The second portion includes the first portion and can therefore be more easily detected accurately than the first portion. The motion of the specific portion can be more easily captured than from the results of tracking the subject, and thus, the accuracy of the centroid and motion is stabilized. Accordingly, the search region in a frame image at the next acquisition time can be more stably set than in the first embodiment, thus increasing the accuracy of detection of the specific portion.

As described above, according to this embodiment, the first portion of the subject and the second portion that includes the first portion are detected by performing detection processing once immediately after acquiring a frame image. The detection ratio of the specific portions is increased by using the consistency in the results of this detection. This enables the subject's eyes to be detected more accurately while suppressing latency from when a frame image is acquired until when the specific portions of the subject are detected, similarly to the first embodiment.

Third Embodiment

This embodiment will describe a system in which whether or not to execute tracking processing is determined based on the detection status of the portions detected in the second embodiment. The system according to this embodiment can speed up the entire detection processing and reduce the computational load related to tracking processing.

An example functional configuration of an image processing apparatus 10 in the system according to this embodiment will be described with reference to the block diagram in FIG. 10. The image processing apparatus 10 is the above-described image processing apparatus 1 that additionally includes a determination module 1001. The operation of the determination module 1001 will be described with reference to the flowchart in FIG. 11.

In step S1101, the determination module 1001 acquires the detected region of the first portion and the detected region of the second portion that have been detected by the portion detection module 103. In step S1102, the determination module 1001 acquires a likelihood score S2 from the likelihood map for the second portion. The likelihood score S2 may be, for example, the largest likelihood in the likelihood map for the second portion, or may be a mean value of likelihoods in the vicinity of the centroid position of the detected region of the second portion in the likelihood map for the second portion.

The determination module 1001 then determines whether or not the likelihood score S2 is larger than or equal to a threshold. If the result of this determination is that the likelihood score S2 is larger than or equal to the threshold (the accuracy of the second portion in the likelihood map for the second portion is high), the processing proceeds to step S1103. On the other hand, if the likelihood score S2 is smaller than the threshold (the accuracy of the second portion in the likelihood map for the second portion is low), the processing proceeds to S1105.

In step S1103, the determination module 1001 acquires a likelihood score S1 from the likelihood map for the first portion. The likelihood score S1 may be, for example, the largest likelihood in the likelihood map for the first portion, or may be a mean value of likelihoods in the vicinity of the centroid position of the detected region of each first portion in the likelihood map for the first portion.

The determination module 1001 then determines whether or not the likelihood score S1 is larger than or equal to a threshold. If the result of this determination is that the likelihood score S1 is larger than or equal to the threshold (the accuracy of the first portion in the likelihood map for the first portion is high), the processing proceeds to step S1104. On the other hand, if the likelihood score S1 is smaller than the threshold (the accuracy of the first portion in the likelihood map for the first portion is low), the processing proceeds to S1105.

In step S1104, the determination module 1001 obtains a variance σ of the distance from the centroid position of the second portion to a position at which the likelihood is larger than or equal to a fixed value in the likelihood map for the second portion. If the variance σ is smaller than or equal to a threshold, the processing proceeds to step S1106. If the variance σ is larger than the threshold, the processing proceeds to step S1105.

In this determination processing, the variance σ tends to be large when the likelihood map includes a plurality of subjects. Therefore, consideration is given to the possibility that even if a subject is correctly detected in one frame image, this subject is likely to be incorrectly detected as another subject in the next frame image. Conversely, if the variance σ is small, nothing other than the subject is present in the surrounding part. This can be understood as a state where the specific portion can be easily detected.

In step S1105, the determination module 1001 determines that tracking processing is necessary and notifies the tracking module 104 of this determination result. On the other hand, in step S1106, the determination module 1001 determines that tracking processing is not necessary and notifies the tracking module 104 of this determination result.

The tracking module 104 performs tracking processing if the determination module 1001 has notified the tracking module 104 that tracking processing is necessary, and does not perform tracking processing if the determination module 1001 has notified the tracking module 104 that tracking processing is not necessary. Note that while the tracking module 104 is not performing tracking processing, the region calculation module 105 continues to output, to the region extraction module 102, the search region that has lately been output to the region extraction module 102.

As described above, according to this embodiment, tracking processing is executed if it is determined that the detection result may become unstable. This can improve the processing speed and reduce the computational load in the image processing apparatus 10.

Fourth Embodiment

Figure 10:
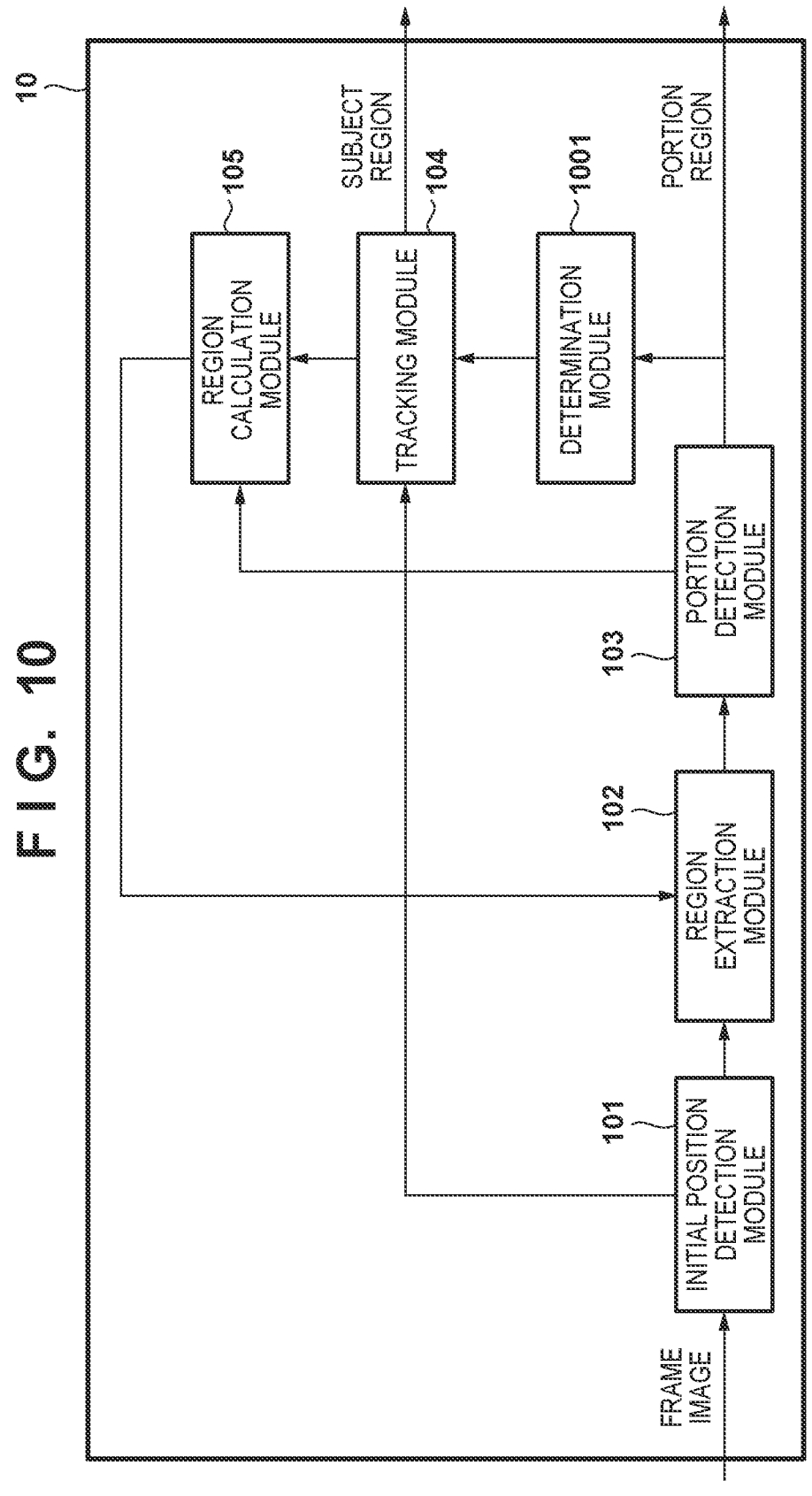
FIG. 10 is a block diagram showing an example functional configuration of an image processing apparatus 10.

The functional modules shown in FIGS. 1 and 10 may be implemented by hardware or software (computer program). In the latter case, a computer device capable of executing the computer program can be applied to the above-described image processing apparatus 1 and image processing apparatus 10.

An example hardware configuration of this type of computer device will be described with reference to the block diagram in FIG. 12. Note that the hardware configuration shown in FIG. 12 is an example of a hardware configuration of a computer device applicable to the image processing apparatus 1 and the image processing apparatus 10 and can be modified/altered as appropriate.

A CPU 1201 executes various types of processing using computer programs and data stored in a RAM 1202 and a ROM 1203. The CPU 1201 thus controls the operation of the entire computer device and executes or controls the above-described processing to be performed by the image processing apparatus 1 or the image processing apparatus 10.

The RAM 1202 has an area for storing computer programs and data loaded from the ROM 1203 and a storage device 1206, and an area for storing data received from outside via an I/F 1207. The RAM 1202 also has a work area used when the CPU 1201 executes various types of processing. Thus, the RAM 1202 can provide various areas as appropriate.

The ROM 1203 stores setting data for the computer device, computer programs and data associated with startup of the computer device, computer programs and data associated with basic operations of the computer device, and so on.

An operation unit 1204 is a user interface such as a keyboard, a mouse and/or a touch panel. A user can input various instructions to the CPU 1201 by operating the operation unit 1204.

A display unit 1205 is a device having a liquid-crystal screen or a touch panel screen, and is capable of displaying the results of processing performed by the CPU 1201 in the form of images, text, or the like. For example, the display unit 1205 can display items for explicitly notifying the user of a frame image, as well as a subject and specific portions (first portion and second portion) in the frame image. The display unit 1205 may also be a projector that projects images and/or text.

The storage device 1206 is a nonvolatile memory such as a hard disk drive. An OS, as well as computer programs and data for causing the CPU 1201 to execute or control the above-described processing to be performed by the image processing apparatus 1 (10) are stored in the storage device 1206. The computer programs and data stored in the storage device 1206 are loaded, as appropriate, to the RAM 1202 under the control of the CPU 1201, and processed by the CPU 1201.

The I/F 1207 is a communication interface for data communication with an external device. For example, frame images captured by an image capture device, such as the aforementioned monitoring camera or electronic camera, are stored in the RAM 1202 and/or the storage device 1206 via the I/F 1207.

All of the aforementioned CPU 1201, RAM 1202, ROM 1203, operation unit 1204, display unit 1205, storage device 1206, and I/F 1207 are connected to a system bus 1208.

In the above-described embodiments, the image capture device (monitoring camera, electronic camera etc.) that captures frame images is a device separate from the image processing apparatus 1 (10). However, the image capture device may alternatively be integrated with the image processing apparatus 1 (10) to constitute a single apparatus (an image processing apparatus with an image capture function).

The region calculation module 105 may generate an enlarged region obtained by enlarging the result of tracking processing (a rectangular region surrounding a subject) in a frame image at the acquisition time t=1 at an enlargement ratio R as a search region in a frame image at the acquisition time t=2. The enlargement ratio R is increased as the moving speed of the subject is higher, for example. In the above step S602, if the present frame image is a frame image at the acquisition time t=2 or later, the region calculation module 105 obtains the centroid position (Xc, Yc) of the search region calculated for the present frame image by the region calculation module 105.

Numerical values, processing timing, processing sequence, data (information) transmission destination/transmission source, or the like used in the above embodiments are examples for giving detailed description, and are not intended to limit the invention to these examples.

Some or all of the above-described embodiments may be combined as appropriate. Some or all of the above-described embodiments may be selectively used.

According to the configuration of the present invention, the time required from when a frame image is acquired until when a specific portion of a subject is detected can be reduced compared to the time required in the case of conventional technologies.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus comprising:
at least one processor; and
at least one memory having stored thereon instructions which, when executed by the at least one processor, cause the image processing apparatus at least to:
detect a specific portion of a subject in a first search region of a first frame image before detecting the subject from the first frame image;
perform tracking processing to track the subject in the first frame image after the specific portion is detected from the first search region; and
specify a second search region in a second frame image following the first frame image based on the first search region in the first frame image, a result of the tracking processing performed on a frame image preceding the first frame image, and a result of the tracking processing performed on the first frame image,
wherein
in the detecting, the specific portion of the subject in the specified second search region of the second frame image is detected before detecting the subject from the second frame image,
in the performing of the tracking processing, the tracking processing to track the subject in the second frame image is performed after the specific portion is detected from the specified second search region, and
in the specifying, a third search region in a third frame image following the second frame image is specified based on the specified second search region in the second frame image, a result of the tracking processing performed on the first frame image, and a result of the tracking processing performed on the second frame image,
wherein the specific portion includes a first portion and a second portion that includes the first portion,
an image in the first search region is acquired as a cropped image,
the first portion is detected based on a likelihood map for the first portion in the cropped image,
the second portion is detected based on a likelihood map for the second portion in the cropped image, and
the tracking processing is determined to be performed in a case where a score based on the likelihood map for the first portion or a score based on the likelihood map for the second portion is smaller than a threshold.

2. The image processing apparatus according to claim 1, wherein a likelihood map for the specific portion in the cropped image is generated, and the specific portion is detected based on the generated likelihood map.

3. The image processing apparatus according to claim 2, wherein
the specific portion is detected based on a filtered likelihood map that is the likelihood map in which a region other than the specific portion has been filtered.

4. The image processing apparatus according to claim 1, wherein
the first portion is detected based on a filtered likelihood map that is the likelihood map for the first portion in which a region other than the first portion has been filtered, and the second portion is detected based on a filtered likelihood map that is the likelihood map for the second portion in which a region other than the second portion has been filtered.

5. The image processing apparatus according to claim 1, wherein
the second search region is obtained based on a region of the second portion in the first frame image, a result of the tracking processing performed on a frame image preceding the first frame image, and a result of the tracking processing performed on the first frame image.

6. The image processing apparatus according to claim 1, wherein
a frame image captured by an image capture device is acquired.

7. The image processing apparatus according to claim 6, wherein
the specific portion of the subject detected in the first search region or a feature value of the specific portion is transmitted to the image capture device and the image capture device is caused to perform autofocus processing and/or zoom processing on the specific portion.

8. The image processing apparatus according to claim 1, wherein in a case where the score based on the likelihood map for the first portion and the score based on the likelihood map for the second portion is not smaller than a threshold, a variance of distance from a centroid position of the second portion to a position at which likelihood is larger than or equal to a fixed value in the likelihood map for the second portion is obtained,
the tracking processing is determined to be performed in a case where the variance is larger than a threshold, and
the tracking processing is determined not to be performed in a case where the variance is smaller than or equal to a threshold.

9. An image processing method to be performed by an image processing apparatus, the method comprising:
detecting a specific portion of a subject in a first search region of a first frame image before detecting the subject from the first frame image;
performing tracking processing to track the subject in the first frame image after the specific portion has been detected in the detection from the first search region; and
specifying a second search region in a second frame image following the first frame image based on the first search region in the first frame image, a result of the tracking processing performed on a frame image preceding the first frame image, and a result of the tracking processing performed on the first frame image,
wherein in the detecting, the specific portion of the subject in the specified second search region of the second frame image is detected before detecting the subject from the second frame image, in the performing of the tracking processing, the tracking processing to track the subject in the second frame image is performed after the specific portion is detected from the specified second search region, and in the specifying, a third search region in a third frame image following the second frame image is specified based on the specified second search region in the second frame image, a result of the tracking processing performed on the first frame image, and a result of the tracking processing performed on the second frame image, wherein the specific portion includes a first portion and a second portion that includes the first portion, an image in the first search region is acquired as a cropped image, the first portion is detected based on a likelihood map for the first portion in the cropped image, the second portion is detected based on a likelihood map for the second portion in the cropped image, and the tracking processing is determined to be performed in a case where a score based on the likelihood map for the first portion or a score based on the likelihood map for the second portion is smaller than a threshold.

10. A non-transitory computer-readable storage medium for storing a computer program for causing a computer to execute an image processing method comprising:

detecting a specific portion of a subject in a first search region of a first frame image before detecting the subject from the first frame image;

performing tracking processing to track the subject in the first frame image after the specific portion has been detected in the detection from the first search region; and specifying a second search region in a second frame image following the first frame image based on the first search region in the first frame image, a result of the tracking processing performed on a frame image preceding the first frame image, and a result of the tracking processing performed on the first frame image, wherein in the detecting, the specific portion of the subject in the specified second search region of the second frame image is detected before detecting the subject from the second frame image, in the performing of the tracking processing, the tracking processing to track the subject in the second frame image is performed after the specific portion is detected from the specified second search region, and in the specifying, a third search region in a third frame image following the second frame image is specified based on the specified second search region in the second frame image, a result of the tracking processing performed on the first frame image, and a result of the tracking processing performed on the second frame image, wherein the specific portion includes a first portion and a second portion that includes the first portion, an image in the first search region is acquired as a cropped image, the first portion is detected based on a likelihood map for the first portion in the cropped image, the second portion is detected based on a likelihood map for the second portion in the cropped image, and the tracking processing is determined to be performed in a case where a score based on the likelihood map for the first portion or a score based on the likelihood map for the second portion is smaller than a threshold.

* * * * *